United States Patent [19]

Seoung

[11] Patent Number: 5,663,623

[45] Date of Patent: Sep. 2, 1997

[54] SERVO APPARATUS AND METHOD FOR HIGH SPEED REPRODUCTION IN DIGITAL VIDEO CASSETTE RECORDERS

[75] Inventor: Gan-soo Seoung, Suwon, Rep. of Korea

[73] Assignee: Samsung Electronics Co., Ltd., Kyungki-Do, Rep. of Korea

[21] Appl. No.: 639,932

[22] Filed: Apr. 26, 1996

[30] Foreign Application Priority Data

Apr. 27, 1995 [KR] Rep. of Korea ................. 95-10193

[51] Int. Cl.$^6$ ............................................... G05B 19/18
[52] U.S. Cl. ............................................... 318/569
[58] Field of Search ............................. 388/608, 648, 388/652

[56] References Cited

U.S. PATENT DOCUMENTS 4,366,371  12/1982  D'Arc et al. ........................... 235/92
4,890,169  12/1989  Kobayashi et al. ................... 360/10.3

Primary Examiner—William M. Shoop, Jr.
Assistant Examiner—Kim Lockett
Attorney, Agent, or Firm—Sughrue, Mion, Zinn, Macpeak & Seas

[57] ABSTRACT

A servo apparatus for high speed reproduction in a digital video tape player includes heads and uses a helically scanned video tape on which high efficient coded video data is recorded in the same manner as being divisionally recorded at positions via which the head travels when intra-coded video data among the high efficient coded video data is reproduced at a high speed. The servo apparatus includes a head drum motor for rotating the head at a constant speed according to high speed reproduction and outputting a signal related to the rotation of the head, a capstan motor for transferring the video tape and outputting a signal related to the transfer of the video tape, a vertical position detector for generating vertical position data of the head with respect to the video tape by using the signal output from the head drum motor and a system clock, a horizontal position detector generating horizontal position data of the head with respect to video tape by using the signals read from the video tape by the head, a head trajectory controller for generating a speed varying signal so that a head traces at positions on which the intra-coded video data is recorded using the vertical position data generated by the vertical position and the horizontal position data generated by the horizontal position detector and prestored head trajectory information for the high speed reproduction and a capstan servo unit which receives the speed varying signal of the head trajectory controller and the output signal of the capstan motor, to control a rotational speed of the capstan motor.

20 Claims, 3 Drawing Sheets

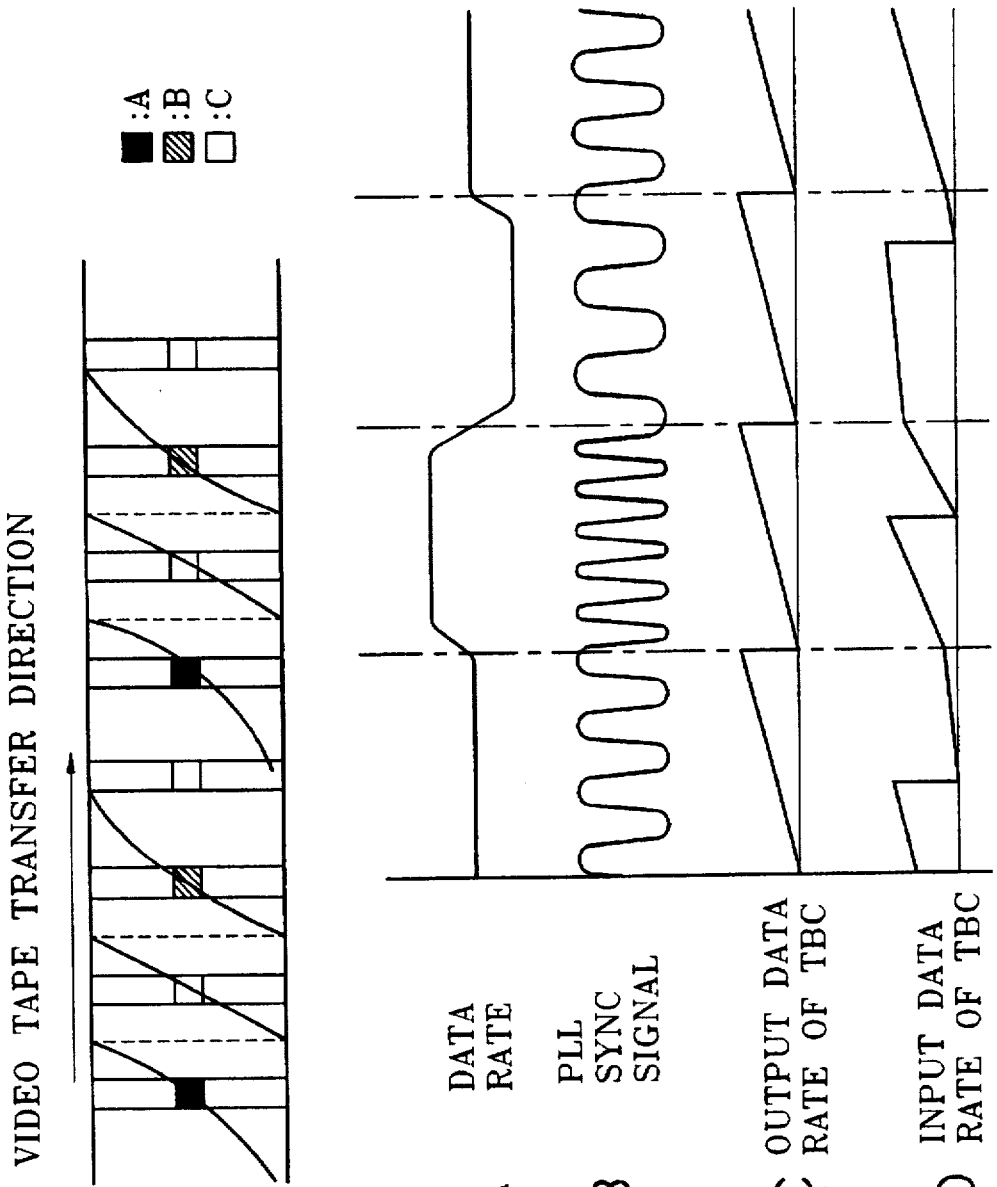

SERVO APPARATUS AND METHOD FOR HIGH SPEED REPRODUCTION IN DIGITAL VIDEO CASSETTE RECORDERS

BACKGROUND OF THE INVENTION

The present invention relates to a servo apparatus and method for high speed reproduction in a digital video cassette recorder (VCR), and more particularly, to a servo apparatus and method which enables a digital VCR to read from a video tape a high efficient coded video signal which has been recorded to be adapted for high speed reproduction.

According to the recommendation proposed by the MPEG (Moving Pictures Experts Group) for a high efficient coding, the highest syntactic structure of the encoded video stream is generally the video sequence. The syntactic structure contains one or more subordinate structures such as a group of pictures (GOP), a picture, a slice, a macroblock and a block.

There are an intra-coded (I) picture (hereinafter called an I-picture), a predictive-coded picture (hereinafter called a P-picture), and a bidirectionally predictive-coded picture (hereinafter called B-picture). These types of the pictures become elements constituting a GOP, in which a coding operation is accomplished in sequence of IBBPBBP . . . . Here, an I-picture is a encoded using information only from itself, a P-picture is a picture which is encoded using motion-compensated prediction from a previous I-picture or P-picture, and a B-picture is a picture which is encoded using motion-compensated prediction from a past and/or future I-picture or P-picture.

When it is required that high efficient coded video data be reproduced from a magnetic tape at a higher speed than a nonpal speed according to a GOP structure, the coded video data is divisionally recorded on the video tape in order to enable an accurate reproduction operation. Such a recording method will be described referring to FIGS. 1 through 3.

FIG. 1 is a conceptual diagram for explaining a recording method for high speed reproduction of high efficient coded video data in a digital VCR. Since an I-picture is a picture encoded by using information only from itself among pictures within one GOP, the encoded video data of the I-picture can be decoded without referring to other picture or pictures. Based on this point of view, the I-picture within each GOP is recorded in the same manner as being distributed at position of tracks indicated as black rectangular boxes on a video tape in FIG. 1, in order to be adapted for high speed reproduction required. The black rectangles shown in FIG. 1 represent portions where the magnetic head always passes during the required high speed reproduction.

According to the MPEG recommendation, an orthogonal transformation coding such as a discrete cosine transform (DCT) is performed for every macroblock having an array of 8×8 pixels. Transform coefficients (or frequency coefficients) within one macroblock in a frequency space have DC levels at the upper-left end position. The transform coefficients have the larger AC levels at the closer lower-right end position. The transform coefficients are hierarchically classified according to their magnitudes. As a result, the video data of the I-picture can be disposed on the video tape so as to be adapted for a digital VCR requiring a multiple high speed such as four-, eight- and sixteen-multiple speed reproduction. This is because human's visual characteristic has a lower sensitivity (resolution) with respect to a fast-moving image than that with respect to a slow-moving image. Accordingly, if the transform coefficients of a macroblock are recorded at tape positions on head tracks corresponding to angular speeds for high speed reproduction, a digital VCR can accomplish high speed reproduction adapted for each of the speeds. This is because it is possible to regenerate an effective image for the high speed reproduction by using only the transform coefficients located at the tape positions on the head tracks at the time of the high speed reproduction.

FIG. 2 shows an example of transform coefficients classified into five hierarchies with reference to the human's visual characteristic. In FIG. 2, the first hierarchy includes only DC components. The second, third and fourth hierarchies are form, in the same manner as that of doubling the number of the transform coefficients in the vertical (or horizontal) direction. The fifth hierarchy includes all transform coefficients contained in a macroblock. FIG. 3 shows an example of recording the video data of the I-picture on tracks in the divided manner according to the hierarchies described with respect to FIG. 2. In FIG. 3, portions indicated as black rectangles represent trac portions located on head tracks during sixteen-multiple, eight-multiple and four-multiple speed reproduction, and hatched rectangles represent track portions placed on the head tracks during the four-multiple speed reproduction. The other portions represent track portions located on the end tracks during the eight-multiple and the four multiple speed reproduction.

When performing a sixteen-multiple speed reproduction operation, since the video data of the I-picture exist on the head tracks for the sixteen-multiple speed reproduction indicated as a solid line in FIG. 3, the digital VCR can regenerate an effective image. The eight-multiple speed reproduction is the same case as the sixteen-multiple speed reproduction.

In case of a digital VCR using a magnetic tape on which the video data is recorded according to the above-described manner with reference to FIGS. 1 through 3, a head drum motor for running head and a capstan motor for transferring the magnetic tape are driven at a constant speed adapted for predeterminedly corresponding high speed reproduction. Accordingly, the running tracks of the head become linear. Thus, when the head drum motor and the capstan motor operate at different speeds from the predetermined speeds, the video data of the I-picture required for the corresponding high speed reproduction cannot be read from the magnetic tape because the I-picture video data is divisionally recorded on the various tracks. As a result, a time delay occurs when a servo portion controls the above speeds. Since the I-picture data necessary for the corresponding high speed reproduction is not restored, a sudden degradation of the picture plurality which is noticeable by the human's eyes takes place.

SUMMARY OF THE INVENTION

Therefore, to solve the above problems, it is an object of the present invention to provide a servo apparatus for high speed reproduction in a digital VCR, which video data necessary for the high speed reproduction is accurately read out from the magnetic tape by adaptively controlling the trace of the head based on a two-dimensional position of the head on the magnetic tape.

Another object of the present invention is to provide a servo method for adaptively controlling the trace of the magnetic head for high speed reproduction based on a two-dimension position of the head on a magnetic tape.

To accomplish the above object of the present invention, there is provided a servo apparatus for high speed reproduction in a digital video tape player, the servo apparatus comprising:

magnetic heads a drum motor for rotating the heads at a constant speed according to the high speed reproduction, and outputting a signal related to the rotation of the head; a capstan motor for transferring the video tape and outputting a sign related to the transfer of the video tape; vertical position detection means for detecting a vertical position of the head with respect to the video tape at a direction perpendicular to a lengthwise direction of the video tape by using the output signal of the head drum motor and a system clock; horizontal position detection means for detecting a horizontal position of the head with respect to the video tape at a direction parallel to the lengthwise direction of the video tape by using the signals read from the video tape by the head; head trajectory control means for generating a speed varying signal so that the head travels at positions on which the video data for high speed reproduction is recorded, by using the vertical position data generated by the vertical position detection means and the horizontal position data generated by the horizontal position detection means and prestored head trajectory information for high speed reproduction; and capstan servo means for controlling a rotational speed of the capstan motor, in response to the speed varying signal of the head trajectory control means and the output signal of the capstan motor.

To achieve another object of the present invention, there is provided a servo method for high speed reproduction in a digital video tape player which includes heads, a head drum motor for rotating the heads and outputting a signal related to the rotation of the heads, and a capstan motor for transferring the video tape and outputting a signal related to the transfer of the video tape, the servo method comprising the steps of:

(a) controlling the head drum motor to be rotated at a constant speed for high speed reproduction;

(b) generating vertical position data representing a vertical position of the head with respect to the video tape at a direction perpendicular to a lengthwise direction of the video tape by using the output signal of the head drum motor and a system clock;

(c) generating a horizontal position data representing a horizontal position of the head with respect to the video tape at a direction parallel to the lengthwise direction of the video tape, by using the signals read from the video tape by the heads;

(d) d varying signal so that the head travels at positions on which the video data for high speed reproduction is recorded by using the vertical position data and the horizontal position data and prestored head trajectory in formation for high speed reproduction; and (e) receiving the speed varying signal and the output signal of the capstan motor, to control the rotational speed of the capstan motor.

BRIEF DESCRIPTION OF THE DRAWINGS

The preferred embodiments are described with reference to the drawings wherein:

FIG. 5 is a view for explaining the trace tracks of the heads which are varied by the FIG. 4 apparatus.

FIGS. 6A through 6D are timing diagrams for explaining a video data processing according to a variable data rate of the FIG. 4 apparatus.

DETAILED DESCRIPTION OF THE PREFERRED EMBODIMENT

A preferred embodiment of the present invention will be described below in more detail with reference to the accompanying drawings FIGS. 4 through 6D.

Figure 1:
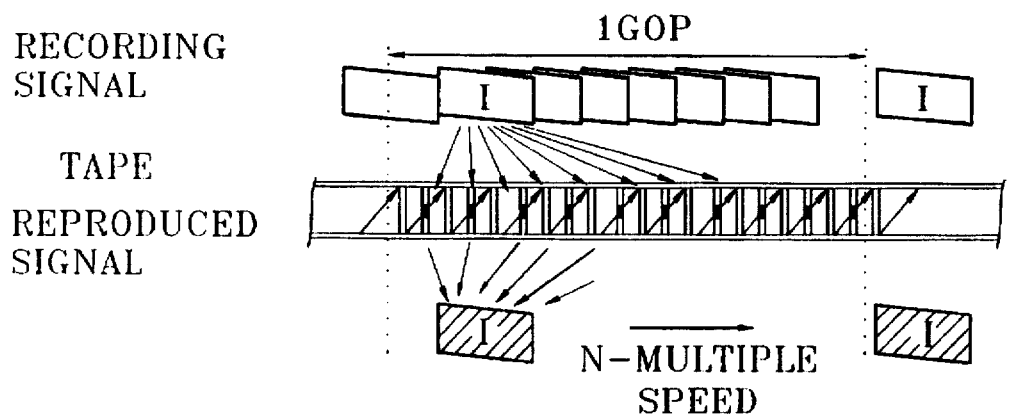
FIG. 1 is a conceptual diagram for explaining a recording method for high speed reproduction of high efficient coded video data in a digital VCR.
Figure 2:
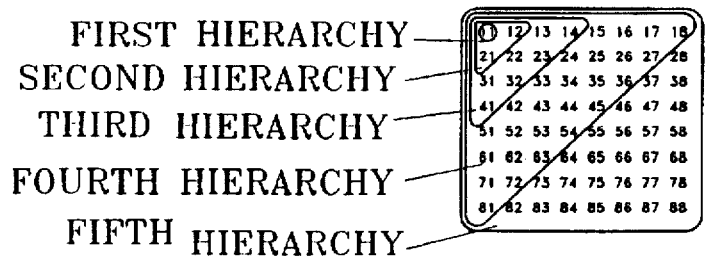
FIG. 2 shows an example of classifying transform coefficients into five hierarchies referring to the human's visual characteristics.
Figure 3:
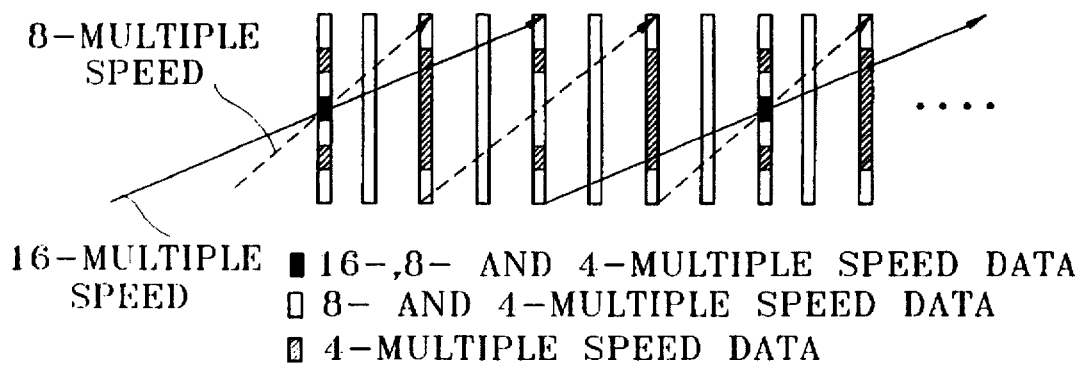
FIG. 3 is an example where I-picture video data is recorded in a manner of being divided according to hierarchy described with reference to FIG. 2.
Figure 4:
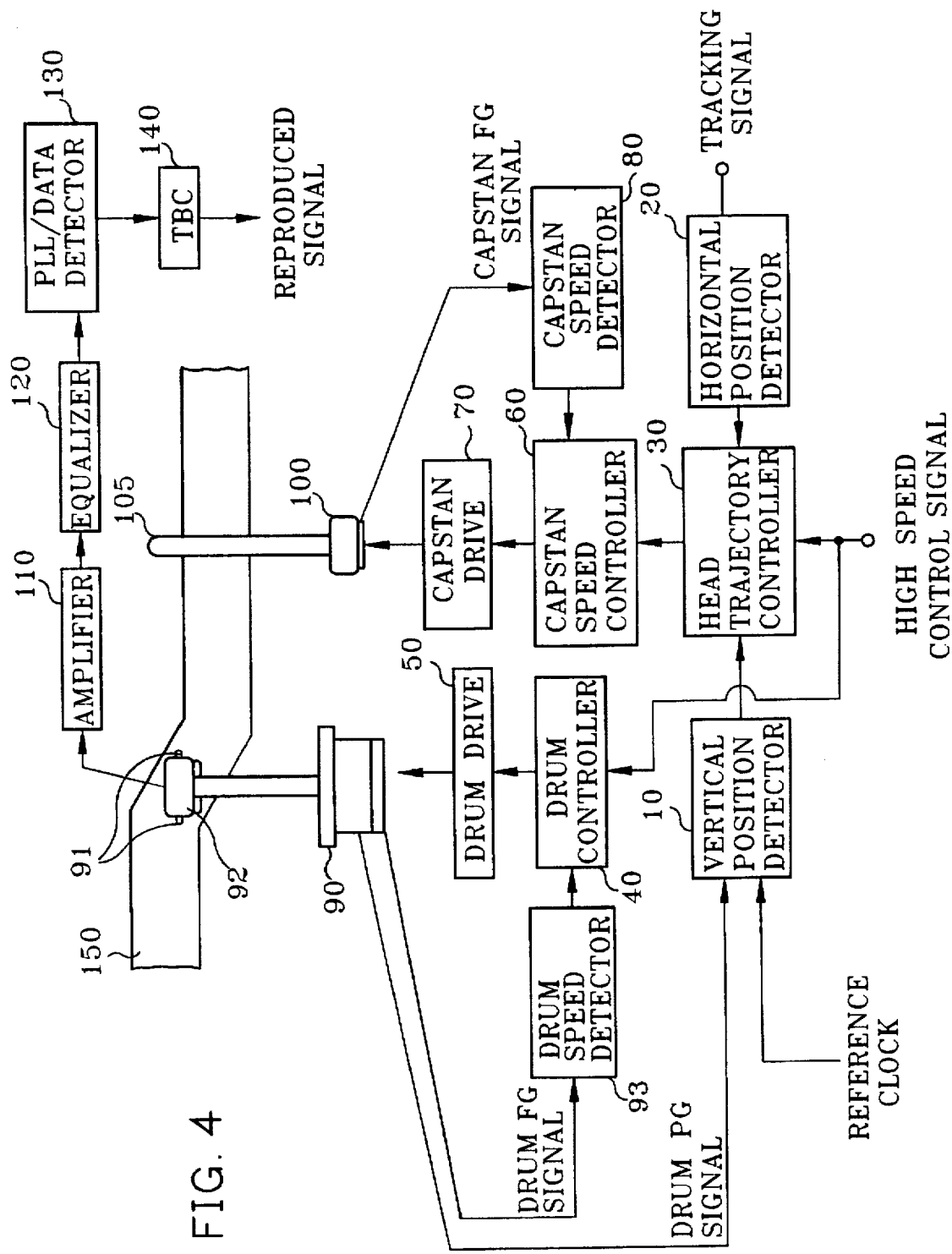
FIG. 4 is a block diagram showing part of a digital VCR according to a preferred embodiment of the present invention.

In FIG. 4 showing part of a digital VCR according to a preferred embodiment of the present invention, the data recorded on a video tape 150 is read by a head 91 and amplified by an amplifier 110 into a level to enable a signal processing. An equalizer 120 compensates for intersymbol interference generated by the head 91 or the amplifier 110 and outputs the interference-compensated data to a phase locked loop (PLL)/data detector 130. The PLL/data detector 130 performs sync locking with respect to the data output from the equalizer 120. As shown in FIG. 6A, a data rate of the data read from the video tape 150 is variable. Thus, as shown in FIG. 6B, the PLL/data detector 130 generates a PLL sync signal in a manner which is varied according to a data rate of input data, and detects video data from the data read from the video tape 150 based on the PLL sync signal. The video data detected by the PLL/data detector 130 has a variable data rate and is supplied to a time-based correction (TBC) circuit 140. The TBC circuit 140 outputs video data having a variable data rate at a constant data rate. The TBC circuit 140 is a kind of a buffer memory and outputs the video data input at a variable input data rate shown in FIG. 6D at a constant data rate shown in FIG. 6C. The blocks of the FIG. 4 apparatus described thus far in connection with signal reproduction have been applied in a general digital VCR and are also adopted in the present invention without modification.

The FIG. 4 apparatus will be described below in more detail with respect to the servo apparatus proposed by the present invention. A head trajectory controller 30 and a drum controller 40 of FIG. 4 are designed to receive a high speed control signal from an external source. The head trajectory controller 30 stores head trajectory information for a plurality of high speed reproduction operations such as a normal speed reproduction operation, a four-multiple speed reproduction operation, an eight-multiple speed reproduction operation and a sixteen-multiple speed reproduction operation.

The head trajectory controller 30 generates a speed varying signal by using corresponding head trajectory information among the stored head trajectory information, vertical position data output from a vertical position detector 10 and horizontal position data output from a horizontal position detector 20, when the input high speed control signal represents a variable high speed control. Meanwhile, the head trajectory controller 30 transmits the high speed control signal to a capstan speed controller 60, when the input high speed control signal represents only a high speed control signal for predetermined high speed reproduction. The drum controller 40 controls a head drum 92 to be rotated at a constant speed for a normal speed reproduction operation when a high speed control signal is not input from an external source. Meanwhile, the drum controller 40 controls rotation of the head drum 92 so that corresponding high speed reproduction operation is accomplished when a high speed control signal for a particular high speed reproduction operation is input from the external source.

When a high speed control signal for a particular high speed reproduction operation is from the external source, the capstan speed controller 60 controls a capstan drive 70 based on the rotation of the capstan motor 100 detected by a capstan speed detector 80. If the capstan motor 100 performs a operation under control of the capstan drive 70, a capstan 105 rotated the capstan motor 100 transfers the video tape and generates a capstan generator (FG) signal. The generation of the capstan FG signal is accomplished by a frequency generator (not shown) contained in the capstan motor 100. The capstan FG signal is transmitted to the capstan speed detector 80. Since the generation of the capstan FG signal is well known to a person skilled in the art, the detailed description thereof will be omitted. The capstan speed detector 80 uses only the input capstan FG signal to detect capstan speed data representing a rotational speed of the capstan 105. The detected capstan speed data is transmitted to the capstan speed controller 60.

If a high speed control signal is input the drum controller 40 controls a drum drive 50 so that a drum motor 90 can rotate at a constant speed according to the high speed control signal. The drum drive 50 controls the drum motor 90 according to a control signal output from the drum controller 40. The drum motor 90 rotates the head drum 92 and generates a drum frequency generator (FG) signal and a drum pulse generator (PG) signal. The generation of the drum FG signal and the drum PG signal is accomplished by a frequency generator (not shown) and a pulse generator (not shown) contained in the drum motor 90. The generation of the drum FG signal and the drum signal is well known to a person skilled in the art, the detailed description thereof will be omitted. If the drum motor 90 rotates the head drum 92, the head 91 fixedly installed in the head drum 92 can travel on the video tape 150 transferred by the capstan 105.

When the head drum 92 and the capstan 105 rotate at a predetermined high speed only, the head 91 travels on the linear head trajectory, and outputs data read from the video tape according to the trajectory of the head. Therefore, when the head 91 does not accurately trace the positions where data necessary the high speed reproduction due to external factors have been recorded, the data necessary for the high speed reproduction cannot read from the video tape. At times, the data necessary for the high speed reproduction cannot be retrieved.

These problems can be solved by using a speed varying signal generated by the head trajectory controller 30 in response to the high speed control signal representing the variable high speed control for use in the capstan speed control of the capstan speed controller 60. Prior to explaining the generation of the speed varying signal in the head trajectory controller 30, operations of the vertical position detector 10 and the horizontal position detector 20 will be described in more detail.

The vertical position detector 10 receives the system clock corresponding to a reference clock and the drum PG signal generated by the drum motor 90. The vertical position detector 10 stores a plurality of head vertical position data for numbers of high speed reproduction. The plurality of each of head vertical position data are stored in a memory (not shown) within the vertical position detector 10 in the form that each head vertical position data corresponds individually to counted values which are obtained by counting the system clock for one pulse period of the drum PG signal during corresponding high speed reproduction. The vertical position detector 10 counts the number of the pulses of the system clock for a pulse period of the drum PG signal and outputs head vertical position data corresponding to a resulting counted value. The head vertical position dam represents a vertical position of the ad which travels on the video tape 150 at a direction perpendicular to a lengthwise direction (or a transfer direction) of the video tape 150. The horizontal position detector 20 receives pilot signals read from the video tape 150 by the head 91 and uses the received pilot signals to generate horizontal position data of the head. The head horizontal position data represents a horizontal position of the head 91 which travels on the video tape 150 at a direction parallel with a lengthwise direction of the video tape 150. Since the generation of the head horizontal position data using the pilot signals can be accomplished by using a head tracking technology of a yell known pilot method, the detailed description thereof will be omitted.

The head vertical position data of the vertical position detector 10 and the head horizontal position data of the horizontal position detector 20 is supplied to the head trajectory controller 30. The head trajectory controller 30 compares the present head position determined by the head vertical position data and the head horizontal position data with the head trajectory information adapted for abe corresponding high speed reproduction, in response to a high speed control signal representing a variable high speed control. The head trajectory information used for comparison is stored in a memory within the head trajectory controller 30 in the form of a lookup table defining a driving method of the capstan motor 100 or a program embodying a calculation equation representing the driving method in correspondence to a normal reproduction operation, a double speed reproduction operation, a four-multiple speed reproduction operation, etc. The head trajectory controller 30 generates a speed varying signal to enable the magnetic head to trace positions on which intra-coded data for corresponding high speed reproduction have been recorded on the video tape 150, when the head position due to the head trajectory information does not equal a present head position. The capstan controller 60 uses a capstan speed data signal output from the capstan speed detector 80 and the speed varying signal output from the capstan speed detector 80 to judge whether or not a transfer speed of the video tape 150 will be controlled. The capstan drive 70 is controlled according the judgement result.

FIG. 5 shows specific examples of trace tracks of the heads which are varied by the FIG. 4 apparatus. Among the trace tracks shown in FIG. 5, the trace tracks passing yet the rectangles "A" which indicated as black boxes are actual trace of the head 91 controlled by the FIG. 4 apparatus when the intra-coded data leads to a portion on which data has been recorded. The trace tracks passing over the hatched rectangles "B" are actual trace tracks of the head 91 controlled by the FIG. 4 apparatus when the intra-coded data lags from a portion on which data has been recorded. The trace tracks passing over the unhatched rectangles "C" represents that the head 91 can trace accurately a portion on which the intra-coded data has been recorded.

It is preferable that the head trajectory information stored in the head trajectory controller 30 has values within the boundary the three following constraint conditions:

Condition 1: Let a sync capable of detecting the video data from output data from the tape 150 be maintained in the PLL/data detector 130.
Condition 2: Let the TBC circuit 140 operate normally.
Condition 3: Protect the video tape 150 from physical damage.

When satisfying the above conditions, the FIG. 4 apparatus can stably reproduce the intra-coded data for the high speed reproduction.

The present invention is not restricted in the above-described embodiment with reference to the FIG. 4 apparatus. Portions which may be modified by variations only among the blocks of the FIG. 4 apparatus will be described below.

According to one modified embodiment, a vertical position detector 10 receives a drum PG signal and a drum FG signal output from the drum motor 90. The vertical position detector 10 stores a plurality of head vertical position data for m tubers of high speed reproduction. Each of head vertical position data is stored in a memory (not shown) within the vertical position detector 10 in the form that each head vertical position data corresponds individually to counted values which are obtained by counting the pulse of the drum FG signal for one pulse period of the drum FG signal during corresponding high speed reproduction. The vertical position detector 10 counts the number of the pulses of the drum FG for one pulse period of the drum FG signal and outputs the head vertical position data corresponding to a resulting counted value.

According to another modified embodiment, a horizontal position detector 20 uses an envelope signal obtained from a signal read from the video tape 150, to thereby generate head horizontal position data. In this case, horizontal position detector 20 counts the number of peaks of the envelop signal, and then determines head horizontal position data based on the number of counted peaks.

According to still modified embodiment, it is applicable to a VCR which uses a control signal recorded in a control track instead of a pilot signal. In this case, a horizontal position detector 20 uses a control signal obtained from a control track of the video tape 150 and an integrated resulting value by integrating pulses of the capstan FG signal for a pulse period of the drum PG signal, to generate head horizontal position data.

As described above, the servo apparatus according to the present invention controls a head trace through which a head actually travels according to a present position of the head with respect to the video tape. As a result, inaccurate head tracking problems which occur when a digital VCR performs a high speed reproduction operation with respect to the video tape on which the intra-coded data has been recorded in the form of being distributed adaptively for the high speed reproduction, can be solved. Thus, since the more intra-coded data can be used in the high speed reproduction compared the existing system, an image regenerated in the high speed reproduction can be maintained with a high quality.

While only certain embodiments of the invention have been specifically described herein, it will intent that numerous modifications may be made thereto without departing the spirit and scope of the invention.

What is claimed is:

1. A servo apparatus for high speed reproduction in a digital video tape player, said servo apparatus comprising:

a plurality of head affixed to a drum;

a head drum motor for rotating said drum and outputting a signal related to the rotational speed of the drum;

a capstan motor for transferring video tape and outputting a signal indicating the transfer speed of said video tape:

vertical position detection means for detecting a vertical position of the head with respect to the video tape, at a direction perpendicular to a lengthwise direction of the video tape, by using the output signal of said head drum motor and a system clock;

horizontal position detection means for detecting a horizontal position of the head with respect to the video tape, at a direction parallel to the lengthwise direction of the video tape, by using signals read from said video tape by said head;

head trajectory control means for generating a speed varying signal so that the head travels at positions on which the video data for high speed reproduction is recorded, by using the vertical position data generated by said vertical position detection means and the horizontal position data generated by said horizontal position detection means and prestored head trajectory information for high speed reproduction; and capstan servo means for controlling the rotational speed of said capstan motor, in response to the speed varying signal of said head trajectory control means and the output signal of said capstan motor.

2. The servo apparatus according to claim 1, wherein said head drum motor outputs a drum pulse generator (PG) signal, and wherein said vertical position detection means stores a plurality of head vertical position data corresponding individually to counted values which indicate a count of a system clock during one pulse period of the drum PG signal, said vertical position detection means further repeatedly counting the number of system clock pulses during one pulse period of said drum PG signal output from said head drum motor, and outputting head vertical position data corresponding to a resulting counted value by referring to the stored head vertical position data.

3. The servo apparatus according to claim 1, wherein said head drum motor outputs a drum pulse generator (PG) signal and a drum frequency generator (FG) signal, and wherein said vertical position detection means stores a plurality of head vertical position data corresponding individually to counted values which indicate the number of pulses of said drum FG signal during one pulse period of the drum PG signal during high speed reproduction, said vertical position detection means further repeatedly counting the number of pulses of the drum FG signal during one pulse period of said drum PG signal, and outputting head vertical position data corresponding to a resulting counted values by referring to the stored head vertical position data.

4. The servo according to claim 1, wherein said horizontal position detection means uses pilot signals read from the video tape to generate head horizontal position data.

5. The servo according to claim 1, wherein said horizontal position detection means an envelope signal obtained from a signal read from the video tape generate head horizontal position data.

6. The servo apparatus according to claim 1, wherein said head drum motor outputs a drum pulse generator (PG) signs and said capstan motor outputs a capstan frequency generator (FG) signal, and wherein said horizontal position detection means uses a control signal obtained from a control track on the video tape and an integrated value obtained by integrating pulses of the capstan FG signal for one pulse period of the drum PG signal to generate head horizontal position data.

7. The servo apparatus according to claim 1, wherein said head trajectory control means operates to generate said speed varying signal in response to a variable high speed control signal supplied from an external source.

8. The servo apparatus according to claim 1, further comprising a phase locked loop (PLL) circuit for maintaining a sync with respect to the video data read by the head, wherein said head trajectory control means generates a speed varying signal within range boundary to thereby maintain the sync.

9. The servo apparatus according to claim 8, further comprising a time-based correction (TBC) circuit which can receive the synchronized video data and regenerate the received video data into an image without jitter, wherein said head trajectory control means generates a speed varying signal within the boundary to enable said TBC circuit to operate normally.

10. The servo according to claim 1, wherein said trajectory control means generates a speed varying signal within a range boundary which does not damage the tape due to the variable rotational speed of said capstan motor.

11. The servo apparatus according to claim 1, wherein said head trajectory control means stores head trajectory information for high speed reproduction in the form of lookup table.

12. The servo apparatus according to claim 1, wherein intra-coded video data among high efficient coded video data is divisionally recorded at positions on which the heads travel in case of high speed reproduction, and a video tape on which high efficient coded video data is recorded is used.

13. A servo method for high speed reproduction in a digital video tape player which includes heads, a head drum motor for rotating the heads and outputting a signal related to the rotation of the heads, and a capstan motor for transferring said video tape and outputting a signal related to the transfer of said video tape, said servo method comprising the steps of:

(a) controlling said head drum motor to be rotated at a constant speed for high speed reproduction;

(b) generating vertical position data representing a vertical position of the head with respect to the video tape at a direction perpendicular to a lengthwise direction of the video tape by using the output signal of said head drum motor and a system clock;

(c) generating a horizontal position data representing a horizontal position of the head with respect to the video tape at a direction parallel to the lengthwise direction of the video tape, by using the signals read from said video tape by said heads;

(d) generating a speed varying signal so that the head travels at positions on which the video data for high speed reproduction is recorded by using said vertical position data and said horizontal position data and prestored head trajectory it formation for high speed reproduction; and (e) receiving said speed varying signal and the output signal of said capstan motor, to control a rotational speed of said capstan motor.

14. The servo method according to claim 13, wherein said step (b) comprises the sub-steps of:

(ba1) storing a plurality of head vertical position data corresponding individually to counted values which are obtained by counting a system clock during high speed reproduction;

(ba2) receiving a drum PG signal output from said head drum motor; and (ba3) counting the number of system clock pulses for one pulse period of said drum pulse generator (PG) signal in said step (ba2), and outputting head vertical position data corresponding to a counted value.

15. The servo method d according to claim 13, wherein said step (b) comprises the sub-steps of:

(bb2) storing a plurality of head vertical position data corresponding individually to counted values which are obtained by counting the pulses of a drum frequency generator (FG) signal during high speed reproduction;

(bb2) receiving a drum PG signal and a drum FG signal from the head drum motor; and (bb3) counting the number of pulses of said drum FG signal for one pulse period of said drum PG signal in said step (bb1), and outputting head vertical position data corresponding to a counted value.

16. The servo method according to claim 13, wherein said step (c) comprises the step of generating head horizontal position data using pilot signals read from the video tape.

17. The servo method according to claim 13, wherein said step (c) comprises the step of generating head horizontal position data using an envelope signal obtained from a signal read from the video tape.

18. The servo method according to claim 13, wherein said step (c) comprises the sub-steps of:

(ca1) receiving the drum pulse generator (PG) signal of said head drum motor, the capstan frequency generator (FG) signal of said capstan motor and a control signal obtained from a control track on the video tape; and (ca2) generating ad horizontal position data using a resulting integrated value obtained by integrating said control signal and the capstan FG signal for one pulse period of the drum PG signal.

19. The servo method according to claim 13, wherein said step (d) comprises the sub-steps of:

(da1) generating present position data of the head using said vertical position data and said horizontal position data;

(da2) judging whether said present position data in said step (da1) equals recording position data of the video data for high speed reproduction which is determined by said head trajectory information; and (da3) generating a varying signal so that a travelling position of the head is in accord with the head trajectory according to said head trajectory information on basis of the judgment result in said step (da2).

20. The servo according to claim 13, wherein intra-coded video data among high efficient coded video data is divisionally recorded at positions on which the heads travel in case of high speed reproduction, and a video tape on which high efficient coded video data is recorded is used.

* * * * *